No. 797,049. PATENTED AUG. 15, 1905.
I. DE KAISER.
ELECTRICAL TERMINAL CONNECTION
APPLICATION FILED NOV. 21, 1903.

2 SHEETS—SHEET 1.

WITNESSES:
F. H. Miller.
Birney Hines

INVENTOR
Isaac De Kaiser
BY
Wesley G. Carr
ATTORNEY

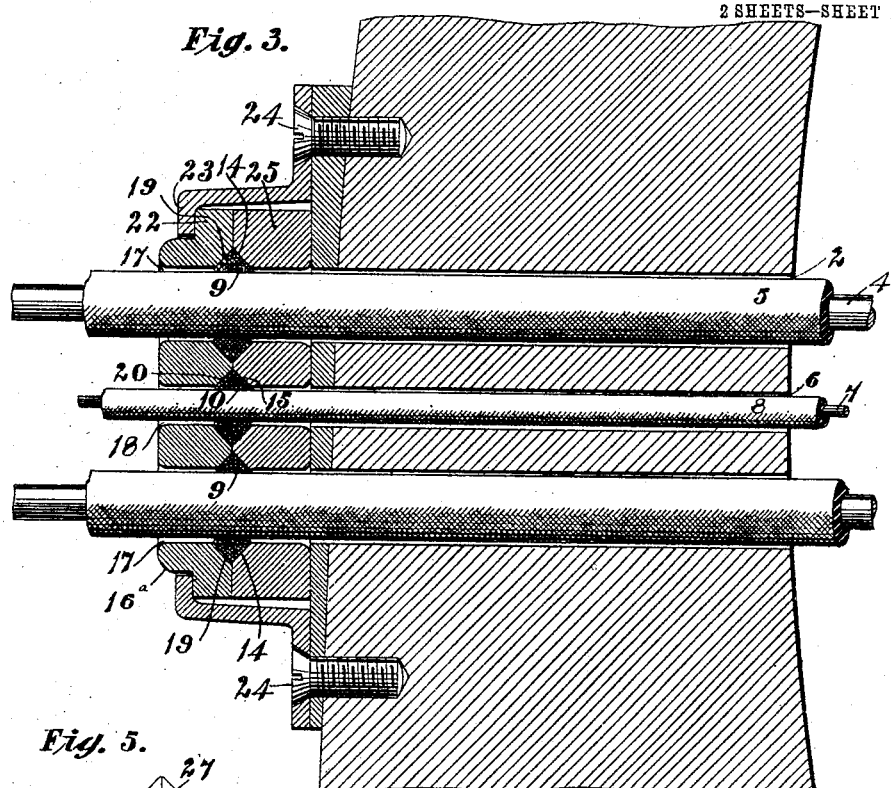# No. 797,049. PATENTED AUG. 15, 1905.
I. DE KAISER.
ELECTRICAL TERMINAL CONNECTION.
APPLICATION FILED NOV. 21, 1903.

UNITED STATES PATENT OFFICE.

ISAAC DE KAISER, OF WILKINSBURG, PENNSYLVANIA, ASSIGNOR TO WESTINGHOUSE ELECTRIC & MANUFACTURING COMPANY, A CORPORATION OF PENNSYLVANIA.

ELECTRICAL TERMINAL CONNECTION.

No. 797,049.     Specification of Letters Patent.     Patented Aug. 15, 1905.

Application filed November 21, 1903. Serial No. 182,167.

*To all whom it may concern:*

Be it known that I, ISAAC DE KAISER, a citizen of the United States, and a resident of Wilkinsburg, in the county of Allegheny and State of Pennsylvania, have invented a new and useful Improvement in Electrical Terminal Connections, of which the following is a specification.

My invention relates to fastening devices for the terminal conductors of electrical machines and apparatus; and it has for its object to provide a device of this character which shall be simple and inexpensive in construction and reliable and durable in service.

My invention is illustrated in the accompanying drawings, in which—

Figure 1:
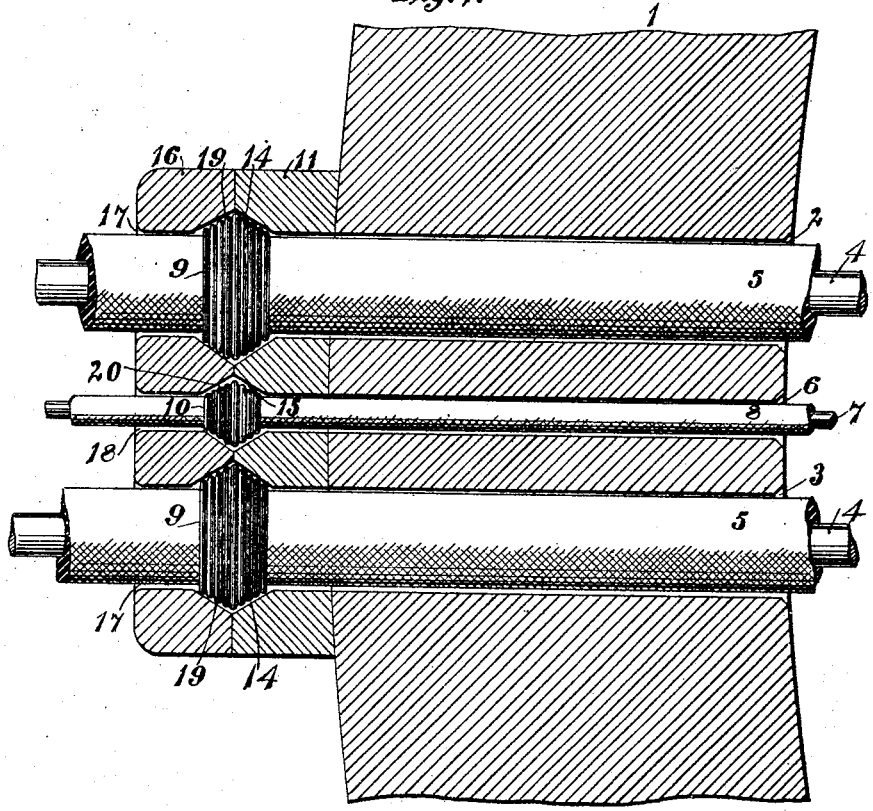
Figure 2:
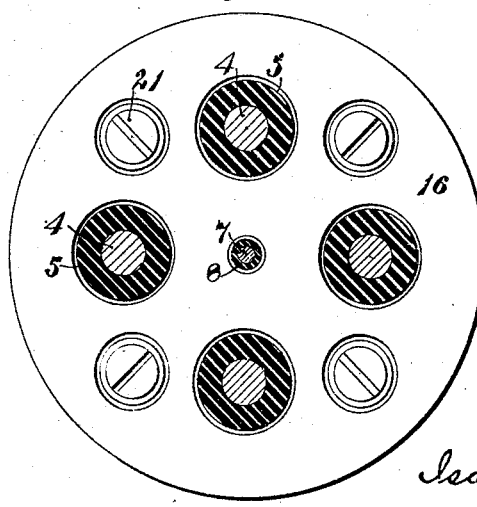

Figure 1 is a sectional view of a portion of an electrical machine provided with my improvement, and Fig. 2 is an end elevation of the terminal block. Fig. 3 is a view corresponding to Fig. 1, but illustrating a modification. Fig. 4 is an end elevation of the block shown in Fig. 3. Fig. 5 is a side elevation of an insulated lead-wire provided with a modified form of stop-ring. Fig. 6 is a detail front elevation of the stop-ring shown in Fig. 5; and Figs. 7 and 8 are views similar to Figs. 5 and 6, but illustrating a further modification of stop-ring.

It is a usual practice to provide electrical machines with external terminal blocks through which connections are made with the machine-windings, and in cases where it is necessary or desirable to connect and disconnect the external conductors at more or less frequent intervals such terminal blocks are provided with binding-posts and screws or analogous means for detachably securing the terminals of the outside service-conductors to the terminals leading from the interior windings of the machine. In many cases, however, electrical machines are installed once for all in the locations where they are to operate and are connected permanently to the external service-conductors. It is in connection with machines for such service that my invention is intended to be used.

Since my invention resides entirely in the terminal-retaining means, it is applicable to various types and kinds of electrical machines, and I have illustrated only a portion of such a machine in the drawings, such portion being a sectional piece 1 of the field-magnet frame. This frame is provided with holes or passages 2 and 3, the number and size of which may obviously be varied to suit the type of machine and the volume of current to be transmitted thereby to or from the machine-windings.

In the present instance I have shown four holes or passages 2 to receive wires or cables 4 of comparatively large size, which are provided with suitable insulating-coverings 5, and one hole or passage 6 of smaller diameter to receive a conductor 7, also provided with a suitable insulating-covering 8. These conductors may be permanently joined to the external service-conductors by solder or other means, which will insure proper electrical conductivity of the joint, and in order to prevent longitudinal movement of the conductors, which might under certain circumstances be effected in such manner as to seriously injure either them or their insulation, or both, I provide the insulating-sheath 5 of each of the conductors 4 with an annular projection or stop-ring 9 of considerable thickness and the insulating-sheath 8 of the conductor 7 with a similar projection 10. As shown in Figs. 1 to 4, the annular projections or stop-rings are formed of a number of turns of cord. Before winding the cord upon these conductors, however, I slip over them a block 11, that has openings 12 and 13, which respectively aline with the openings 2 and 6 and which are countersunk, as indicated at 14 and 15. After the lengths of cord are wound upon the sheaths 5 and 8 the projections 9 and 10 formed thereby are seated in the countersunk portions 14 and 15, and a similar block 16, provided with registering openings 17 and 18 and countersunk portions 19 and 20, is slipped over the conductors and into engagement with the block 11. These blocks may be fastened together and to the frame of the machine by any suitable means. In the form shown in Figs. 1 and 2 the blocks are fastened together and to the machine-frame by means of screws 21. In the form shown in Figs. 3 and 4 the outer portion 16ª of the block is cut away to form a circumferential shoulder 22, over and against which fits a cap 23, the latter being fastened to the machine-frame 1 by means of screws 24. A block 25 may be interposed between the inner face of the cap and the frame of the machine where the contour of the latter is such that the inner faces of the cap and block do not conform thereto.

In Figs. 5 and 6 I have shown an annular projection or stop-ring 26, consisting of two frusto-conical metal parts 27, the edges of which are provided with slits 28 in order that the intervening portions may be bent inward to grip the insulating-sheath 5.

In Figs. 7 and 8 I have shown a divided stop-ring 29, which may be composed of any suitable material through which tacks or brads 30 may be driven to hold it in position on the insulating-sheath 5.

Stop-rings of other form and material and otherwise fastened in position may obviously be employed and variations from what is shown as regards other parts of my improvement which do not involve different functional characteristics may also be made within the scope of my invention.

I claim as my invention—

1. The combination with the frame of an electrical machine, of insulated terminal conductors having rings of cord wound thereon, a two-part block having openings to receive said conductors and rings and means for fastening said block parts together and to the machine-frame.

2. In an electrical machine, a plurality of terminal wires having annular projections outside the machine-frame, a two-part block having holes to receive said terminal wires and recesses for said projections, and fastening means that serve to clamp the block parts together and also to the frame.

3. Terminal-conductor-fastening means comprising convex rings rigidly attached to the conductors, two-part blocks having holes for the conductors and recesses for the rings and fastening means that serve to clamp the block parts together and also to the machine-frame.

4. The combination, in an electrical machine, of the machine-frame, a plurality of insulated terminal conductors projecting through openings in the frame and having rings formed of cord wound thereon outside the frame, with a block comprising two parts having alined openings for the conductors and complementary recesses for the rings and fastening means serving to clamp the block parts together and also the block to the machine-frame.

5. In an electrical machine, the combination with the machine-frame and a plurality of terminal conductors projecting through holes therein and provided with convex rings formed of cord and wound thereon, of a block comprising two parts having alined holes to receive the conductors and recesses to receive the rings and means for fastening the two parts of the block together and to the machine-frame.

In testimony whereof I have hereunto subscribed my name this 10th day of November, 1903.

ISAAC DE KAISER.

Witnesses:
 BIRNEY HINES,
 HOWARD C. SIMPSON.